United States Patent
Kitai

[15] 3,646,860
[45] Mar. 7, 1972

[54] CAMERA WITH AUTOMATICALLY CHARGED SHUTTER

[72] Inventor: Kiyoshi Kitai, Tokyo, Japan

[73] Assignee: Kabushiki Kaisha Hattori Tokeiten, Tokyo, Japan

[22] Filed: June 18, 1969

[21] Appl. No.: 834,457

[30] Foreign Application Priority Data

June 19, 1968 Japan...................................43/42168

[52] U.S. Cl. ........................................95/10 CT, 95/53 EB
[51] Int. Cl........................................G03b 7/08, G03b 9/08
[58] Field of Search......................95/53 R, 53 E, 64 R, 10 C

[56] References Cited

UNITED STATES PATENTS 3,407,716   10/1968   Wick et al. ..............................95/53 E

FOREIGN PATENTS OR APPLICATIONS 1,285,295   12/1968   Germany................................95/53 E Primary Examiner—Samuel S. Matthews
Assistant Examiner—Russell E. Adams, Jr.
Attorney—Robert E. Burns and Emmanuel J. Lobato

[57] ABSTRACT

A camera with an electronic shutter of simplified construction without a cocking or charging member. The shutter initiates an exposure approximately at the end of the depression stroke of a release member and has means including a delay circuit having a photoelectric element sensing the brightness and an electromagnet for automatically controlling exposure aperture opening and exposure time in accordance with the brightness of a subject or field being photographed. The shutter has mechanism for charging it automatically when the release member is restored to a rest position by a resilient member.

3 Claims, 4 Drawing Figures

CAMERA WITH AUTOMATICALLY CHARGED SHUTTER

The present invention relates generally to a photographic camera and more particularly to an electronic shutter for automatically controlling an exposure in accordance with a combination of a given aperture and time determined in response to ambient illumination in the field being photographed.

In electronic shutters delay means control the opening movement of the shutter blades such that the aperture opening of the blades is varied in a predetermined relation to the lapse of time of the opening movement, an electronic delay circuit including a photoelectric element initiates, the actuation with relation to the opening movement of the blades, displacement of the blades to a closed position when the exposure time has achieved an appropriate value.

Conventional shutters have a cocking or charging member and a release member. The cocking or charging member charges the delay means and a closing means for closing the shutter blades against their respective driving means. The release member initiates operation and actuates an electronic delay circuit. Alternatively, in using a camera, the user must first charge a charging member and then operate a release member. The construction of the camera or the shutter is complicated in these known cameras.

It is the object of the present invention to provide a simplified electronic shutter.

Another object of the present invention is to provide an improved shutter without a cocking or charging member. The shutter starts to open an aperture opening of the blades on depression of a release member and is charged on return to a rest position of the release member.

According to the present invention a photographic camera has in combination with an electronic shutter, which comprises shutter blade means, delay means which control the aperture opening of the blade means in a predetermined relation to the lapse of the time it takes to open the blades. Manually operable release means release the delay means for initiation of an exposure. An electronic delay circuit including a photoelectronic element and an electromagnet is provided. A closing means controls the time the electromagnet terminates the exposure. The release means lets the delay means and the losing means displace respectively to a charged position when the release means returns to its rest position and initiate an actuation of said delay means when said release means reaches approximately an end of the depression stroke and immediately initiating actuation of the delay circuit. The shutter blade means start the opening movement following actuation of the delay means.

The release means lets the delay means displace to a charged position through an intermediate member when the release means returns to its rest position. The intermediate member is intermediate the delay means and release means. Locking means lock it in the charged position of the delay means. During progressive depression of the release means the intermediate member is released from its locked position at approximately the end of the depression stroke of the release means and thereafter initiation of the delay means takes place under the influence of a resilient force.

Other features and advantages of the electronic shutters according to the present invention will be better understood as described in the following specification and appended claims in conjunction with the following drawings in which:

Figure 1:
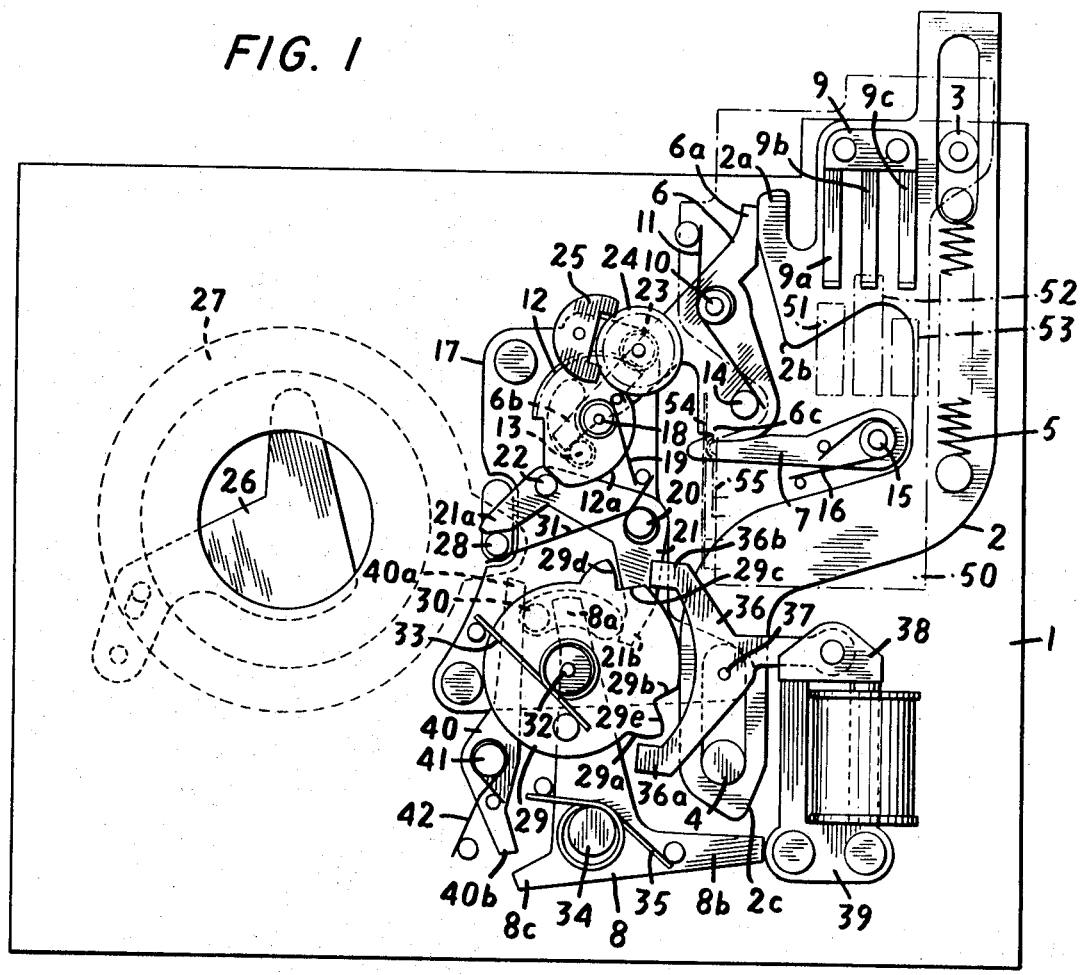
FIG. 1, is a front elevation view of apparatus according to the invention.

An embodiment of the invention will now be illustrated with reference to the drawing in which, a mounting plate is generally designated 1. A release lever 2, guided by pins 3, 4 on the plate 1, is movable upwardly and downwardly and is biased upwardly by a spring 5. The release lever 2 is provided with an arm 2a actuating a delay means setting lever 6, a projection 2b for operating an engaging lever 7, and a projection 2c for operating a driving cam-setting lever 8. The lever 2 also has a contact member of a switch to control an electric circuit later described. The delay means setting lever 6 is pivotally mounted on a shaft 10 and is biased in a clockwise direction by a spring 11. The setting lever 6 comprises a driven arm 6a in contact with an arm 2a of the release lever 2, an arm 6b acting on a pin 13 of a segment gear 12 of the delay means, and a portion engaging with the engaging lever 7 as well as a pin 14 associated with a contact member 54 of a timing switch later described. The engaging lever 7 is pivotally mounted on a shaft 15 and is biased in a clockwise direction by a spring 16. The gear 12 on the baseplate 17 of the delay means is mounted on a shaft 18 and is rotatable in a clockwise direction by a spring 19. The gear 12 is prevented from rotation by the arm 6b of the delay means setting lever 6 through a pin 13. A cam surface 12a is formed on the gear 12 associated with a pin 22 of a ring lever 21 which is pivoted on a shaft 20 of the baseplate of the delay means. The gear 12 meshes with a pinion 23 and a star wheel 24 meshes with an anchor 25.

One arm 21a of the ring lever 21 contacts a pin 28 of a shutter ring 27 to open and close shutter blade means 26 and the other arm 21b is in contact with a pin 30 of the drive cam 29. A spring 31 acting on the pin 28 of the shutter ring 27, rotates the shutter ring 27 in a counterclockwise direction to open the shutter blade means but is prevented from rotation by the cam surface 12a of the gear 12 through the arm 21a of the ring lever 21 and the pin 22.

A drive cam 29 is mounted on a shaft 32 on the baseplate of the delay means, which is biased in a clockwise direction by a spring 33. Rotation of the drive cam is prevented by the pin 30 of the drive cam 29 contacting the arm 8a of the drive cam-setting lever 8 pivoted on a shaft 34 and rotatable in a counterclockwise direction by a spring 35. The drive cam 29 is provided with cam surfaces 29a, 29b, 29c, 29d, and 29e associated with a control lever 36 later described. The control lever 36 is mounted pivotally on a shaft 37 on the baseplate 17 of the delay means and has an arm 36a associated with cam surfaces 29a, 29b, and 29c of the drive cam 29 and an arm 36b associated with the cam surface 29c and 29d and on the right end an armature 38 attracted by a yoke 39 of an electromagnet. A rockable lever 40 is pivotally mounted on a shaft 41 on the mounting plate, and is biased in a clockwise direction, and one arm 40a contacts with a pin 30 of the drive cam and another arm 40b associates with the arm 8c of the drive cam-setting lever 8.

Figure 3:
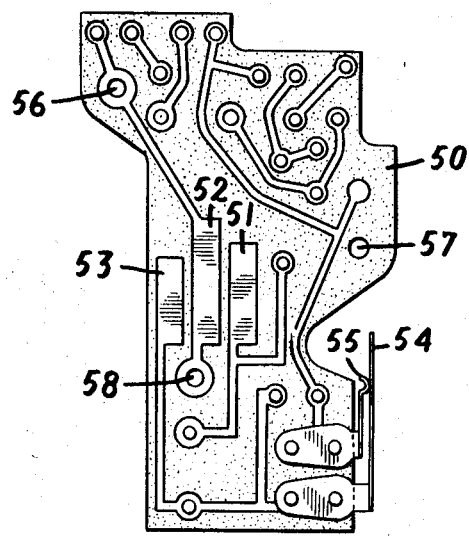
FIG. 3, is a back view of a circuit board in the mechanism of FIG. 1.

In FIG. 3, a printed circuit board 50 is illustrated with necessary parts comprising leads 9a, 9b, 9c of a contact member 9 on the release lever 2 and respectively associated contacts 51, 52, 53, contact members 54, 55 as timing switches, and holes or openings 56, 57, 58 respectively receiving the pin 3, shafts 10 and 15 of FIG. 1. Positions in which these parts are provided are shown in FIG. 1 by chain lines.

Figure 4:
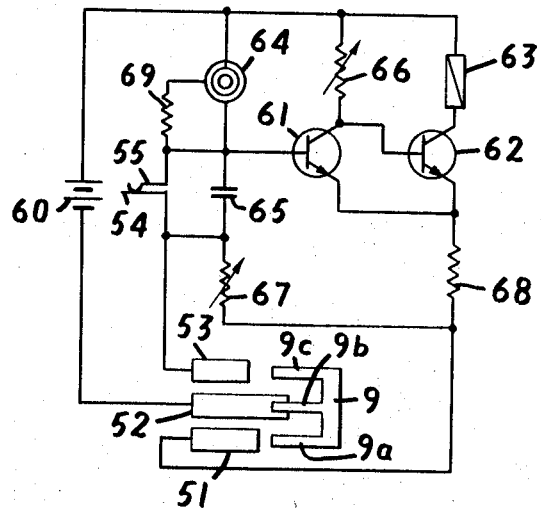
FIG. 4, is a schematic of circuitry associated with the mechanism in FIG. 1 according to the invention.

FIG. 4 is a schematic diagram of electric circuits, which comprise a power source 60, an operating first transistor 61, a second transistor 62, a coil 63 of an electromagnet, a photosensitive Cds 64, a condenser 65, variable resistances 66, 67, a fixed resistance 68, a correction resistance of Cds 69, leads 9a, 9b, 9c of the contact member and corresponding portions 51, 52, 53, and contact members 54, 55 of a timing switch connected as illustrated. With the construction described the invention carries out its operation in the following manner:

When the release lever 2 is depressed against the spring 5 the lead 9a of the contact member 9 and the contact portion 51 meet. There is established a mode for effecting detection of the brightness of an object being photographed at this stage.

ON or OFF operation of the first transistor 61 depends on whether the base potential of the first transistor is larger or smaller than its ON level. The base potential is decided by a basic resistance determined by the resistance of Cds 64 and the variable resistance 67. If the brightness of an object being photographed is low the resistance of Cds is high (at this time the condenser 65 is short-circuited by the timing switches 54,55) so that the base potential turns low and the transistor 61 is in an OFF condition, accordingly the second transistor 62 is ON and a current flows in the operating coil 63 of the electromagnet, the yoke 39 of the electromagnet is thereby excited and attracts the armature 38.

By further depression of the release lever 2, the projection 2c will push the arm 8b of the drive cam-setting lever 8, which in turn rotates in a clockwise direction. In company with the rotation of the lever 8 the drive cam 29 rotates in a clockwise direction by its rotary force. Though the cam surface 29a pushes the arm 36a of the control lever 36 to turn counterclockwise the armature 38 is attracted by the electromagnet as described rendering the control lever unable to rotate. The drive cam 29 stops at a position slightly biased clockwise. Accordingly, the rockable lever 40 rotates clockwise following the pin 30 of the drive cam 29 and stops at a position slightly biased clockwise. The arm 40b stays within a path of rotation of the drive cam-setting lever 8 so that the drive cam-setting lever 8 is prevented half-way from rotation in a clockwise direction and the depression of the release lever 2 is also obstructed in this way.

When the brightness of an object being photographed is high the resistance value of Cds is low so that the base potential of the first transistor 61 is high, in which case the transistor 61 is ON and the second transistor 62 is OFF so that a current does not flow in the operating coil 63 and the control lever is enabled to make a rotation. Accordingly, by depression of the release lever 2 as described, the drive cam-setting lever 8 rotates in a clockwise direction. Following the rotation, the drive cam 29 rotates clockwise by its own rotary force and its cam surface 29a pushes the arm 36a of the control lever 36 to rotate the control lever counterclockwise. By continued depression of the release lever 2 the lead 9c of the contact piece 9 and the contact portion 53 come in contact so that the first transistor 61 turns low in base potential and is OFF and the second transistor 62 turns ON and a current flows in the operating coil 63 and the electromagnet is excited. In this position the control lever 36 is unable to rotate in a counterclockwise direction by attraction of the electromagnet because a clearance between the armature 38 and the yoke 39 of the electromagnet.

By still further depression of the release lever 2 the drive cam 29 furthermore rotates in a clockwise direction, and the cam surface 29d pushes the arm 36b of the control lever 36 to turn the control lever 36 in a clockwise direction so that the armature 38 closes the yoke 39 of the electromagnet, its clearance being reduced, and the control lever 36, since it is attracted by the yoke 39 of the electromagnet, which is excited, cannot make a rotation. A clockwise rotation of the drive cam 29 is obstructed by movement of the cam surface 29b contacting the arm 36a of the control lever 36. The rockable lever 40 on the other hand follows the pin 30 of the drive cam 29 to rotate in the clockwise direction. Since the rotation is larger than when the brightness of an object is low, the arm 40b moves out of the path of rotation of the arm 8c of the drive cam-setting lever 8 and the depression of the release lever 2 is not obstructed.

Figure 2:
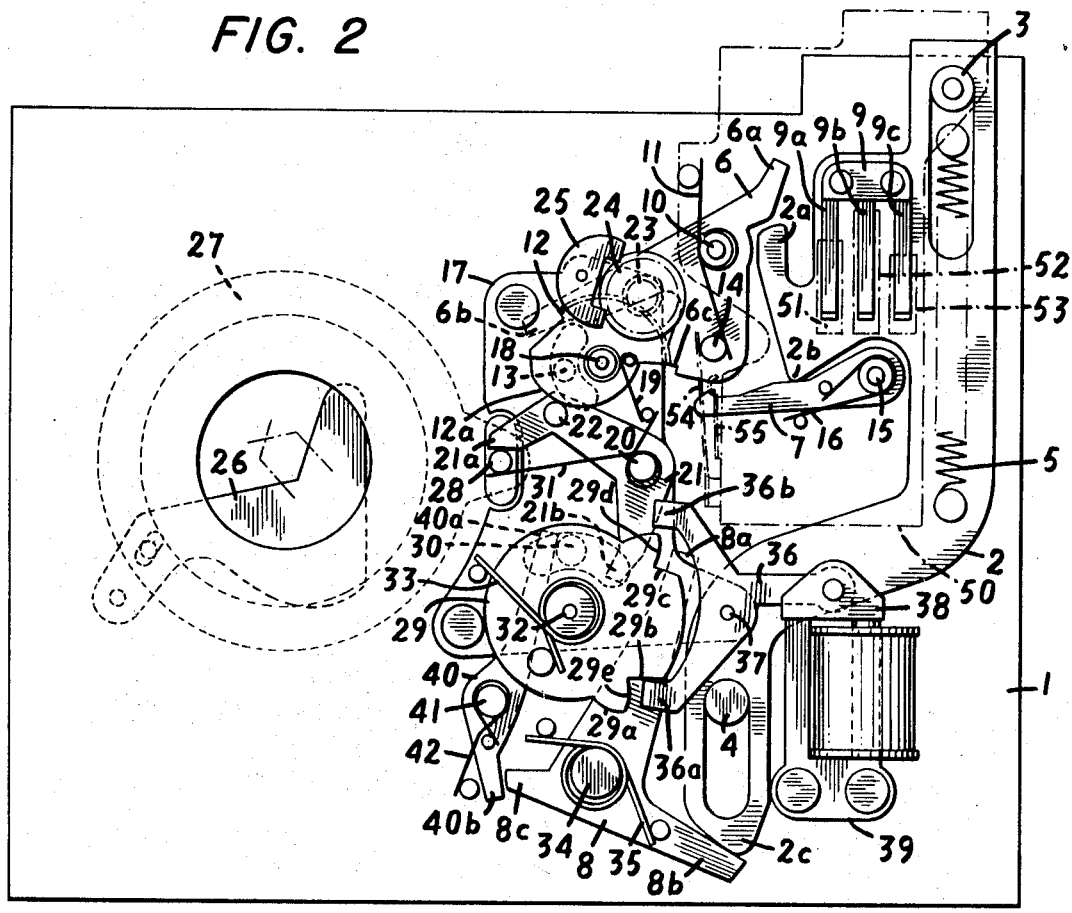
FIG. 2, is a front elevation view of the mechanism of FIG. 1 illustrating the mechanism in an operating position corresponding to a condition in which a release lever has been depressed for effecting an exposure.

Still upon further depression of the release lever 2 the projection 2b pushes the engaging pawl 7 which in turn rotates in a counterclockwise direction and releases the engagement of the delay means setting lever 6 so that the setting lever 6 rotates in a clockwise direction by its own rotational force. With the clockwise rotation of the delay means setting lever 6 the gear 12 initiates a rightward rotation by its own rotary force through the star wheel 24 oscillating the anchor 25. Through the pin 28, ring lever 21, and pin 22 of the ring lever the shutter ring 27 rotates by a counterclockwise operation following the cam surface 12a of the gear 12 and opens the shutter blade means 26. Because of this movement the pin 14 of the delay means setting lever 6 pushes the contact member 54 of the timing switch and interrupts the contact of the contact member 55 resulting in the condenser 65 being charged electrically through the photosensitive CdS 64. The relationship of the position of all parts at this stage of operation is illustrated in FIG. 2.

With the progress of the charging of the condenser 65 and the excess of base potential of the transistor 61 over its ON level, the transistor 61 turns ON. Accordingly, the transistor 62 turns OFF. In consequence, the current of the operating coil 63 is interrupted and the electromagnet loses its attraction. The control lever 36 can then rotate in a counterclockwise direction and the drive cam 29 rotates in the clockwise direction by its own rotational force. The pin 30 pushes the arm 21b of the ring lever 21 to rotate in a counterclockwise direction, turns the shutter ring 27 clockwise against its counterclockwise force closing the shutter blade means 26 and completes the exposure operation.

After the exposure operation has been completed and the depression of the release lever 2 has been removed, the release lever 2 rises due to the force of the spring 5. The arm 2a pushes the driven arm 6a of the delay means setting lever 6 to turn in a counterclockwise direction and the other arm 6b rotates the gear 12 counterclockwise through the pin 13. The contact member 54 of the timing switch comes in contact with the contact member 55 whereupon the engaging lever 7 engages with the engaging portion 6c of the delay means setting lever 6. Thereafter the arm 8a of the drive cam-setting lever 8 rotated counterclockwise after the upward rise of the release lever 2 pushes the pin 30 of the drive cam 29 to turn it counterclockwise against its clockwise rotation, and halfway in its counterclockwise rotation its rotation is interrupted at one time at a position in which the cam surface 29e contacts the arm 36a of the control lever 36, because the timing switch has been closed, as described, and the transistor 61 is OFF and the transistor 62 is ON and the electromagnet is excited so that the control lever 8 cannot rotate counterclockwise. However, the release lever 2 can rise upwardly irrespective of the above-described situation. When the lead 9a of the contact member 9 detaches from the contact portion 51, the power source is cut off and the electromagnet is deenergized, in consequence the control lever 36 can rotate in a counterclockwise direction. The drive cam 29 is rotated counterclockwise by the drive cam-setting lever 8 and returns to the position shown in FIG. 1.

According to the present invention a reciprocatory movement of the camera release means can be used effectively so that on the depression of the release means it is possible to detect the brightness of the field being photographed and to release the delay means for initiating an exposure and on return to a rest position of the release means it is possible for the drive cam and the delay means for controlling an opening movement of shutter blades to displace to respective charged positions.

An advantage of these mechanisms is that the construction of a camera can be extremely simplified and particularly a camera in which the film is advanced not manually but automatically, i.e., by a driving motor. Further the actuation, i.e., the depression, by the camera user, of the release member can be achieved more smoothly than the conventional release means in which charging and releasing the shutter are done on the depression of the release means.

A long time exposure can be provided for by providing an exchangable apparatus manually operable instead of the rockable lever obstructing the depression of the release member when the subject being photographed has a low brightness or is dark.

Since certain changes may be made in the above apparatus without departing from the scope of the invention herein involved, it is intended that all the matter contained in the above description or shown in the accompanying drawings shall be interpreted as illustrative and not in a limiting sense.

What I claim and desire to secure by letters patent is:

1. A photographic camera having an electronic shutter in combination, shutter blade means operable from a closed condition to an open condition defining an exposure aperture and back to said closed condition, delay means operable from a charged position for controlling opening of said blade means for defining the exposure aperture in predetermined relation to the lapse of time for opening said shutter blade means for defining said exposure aperture, release means manually operable from a rest position to initiate actuation of said delay means for initiation of an exposure, an electronic delay circuit including a photoelectronic element and an electromagnet switch, closing means and means in said delay circuit controlling the time of actuation of said electromagnet for terminating the exposure time, means restoring said delay means and means restoring said switch closing means respectively to a charged position in readiness for taking an exposure when said release means returns to said rest position including means initiating actuation of said delay means when said release means reaches approximately an end of the depression stroke thereof and including means immediately initiating actuation of said delay circuit when said release means is depressed.

2. In a photographic camera having an electronic shutter according to claim 1, including means coactive with said delay means and said shutter blade means to initiate opening of said shutter blade means following actuation of said delay means.

3. In a photographic camera having an electronic shutter according to claim 1, in which said means restoring said delay means comprises an intermediate member intermediate said delay means and said release means and means in said delay means to effect return of said delay means to said charged position when said release returns to said rest position, means to return said release means to said rest position, locking means locking said intermediate member when said delay means is in said charged position, and means on said release means releasing said locking means during progressive depression of said release means approximately at the end of said depression stroke of said release means to release said delay means.

* * * * *